US009242642B2

(12) United States Patent
Hayashi et al.

(10) Patent No.: US 9,242,642 B2
(45) Date of Patent: Jan. 26, 2016

(54) ELECTRICALLY-POWERED VEHICLE AND METHOD OF CONTROLLING THE SAME

(75) Inventors: Kazuhito Hayashi, Inazawa (JP); Mikio Yamazaki, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/351,037

(22) PCT Filed: Oct. 27, 2011

(86) PCT No.: PCT/JP2011/074810
§ 371 (c)(1),
(2), (4) Date: Apr. 10, 2014

(87) PCT Pub. No.: WO2013/061444
PCT Pub. Date: May 2, 2013

(65) Prior Publication Data
US 2014/0297085 A1    Oct. 2, 2014

(51) Int. Cl.
*B60W 10/06* (2006.01)
*B60W 20/00* (2006.01)
*B60K 6/445* (2007.10)
*B60W 10/08* (2006.01)
*B60L 15/20* (2006.01)

(52) U.S. Cl.
CPC ............. *B60W 20/108* (2013.01); *B60K 6/445* (2013.01); *B60L 15/2045* (2013.01); *B60W 10/06* (2013.01); *B60W 10/08* (2013.01); *B60W 20/00* (2013.01); *B60L 2240/421* (2013.01); *B60L 2240/423* (2013.01); *B60L 2240/425* (2013.01); *B60L 2260/44* (2013.01); *B60W 2710/083* (2013.01); *Y02T 10/6239* (2013.01); *Y02T 10/642* (2013.01); *Y02T 10/7283* (2013.01); *Y10S 903/93* (2013.01)

(58) Field of Classification Search
CPC ...... B60K 6/445; B60K 6/48; B60L 15/2045;
B60L 2240/421; B60L 2240/423; B60L
2240/425; B60L 2260/44; B60W 10/06;
B60W 10/08; B60W 10/26; B60W 20/00;
B60W 20/102; B60W 20/106; B60W 20/108;
B60W 20/20; B60W 2510/244; B60W
2600/00; B60W 2710/0644; B60W
2710/0666; B60W 2710/083; B60W
2710/105; Y02T 10/6239; Y02T 10/642;
Y02T 10/7283; Y10S 903/93
See application file for complete search history.

(56) References Cited

U.S. PATENT DOCUMENTS 8,965,615 B2 *   2/2015   Brandenstein et al. ......... 701/22
2002/0041167 A1 * 4/2002  Kitano et al. ...................... 318/3
(Continued)

FOREIGN PATENT DOCUMENTS

JP    2000-125413 A    4/2000
JP    2002-030952 A    1/2002
(Continued)

*Primary Examiner* — Thomas G Black
*Assistant Examiner* — Ce Li
(74) *Attorney, Agent, or Firm* — Sughrue Mion, PLLC

(57) ABSTRACT

An inverter performs bidirectional DC/AC power conversion between a power line and a second MG so as to control an output torque of the second MG for generating vehicle driving force. A PM-ECU sets a torque command value of the second MG such that requested driving force for an entire vehicle is exerted on a drive shaft. An MG-ECU estimates, based on a rotation speed of the second MG, a magnitude of a drag torque acting as rotational resistance when the second MG rotates at zero torque, and stops the inverter in accordance with a difference between the estimated drag torque and the torque command value.

8 Claims, 7 Drawing Sheets

(56) References Cited

U.S. PATENT DOCUMENTS

2012/0095635 A1* 4/2012 Kanno et al. .................. 701/22
2013/0204475 A1* 8/2013 Brandenstein et al. ......... 701/22
2013/0210575 A1* 8/2013 Kumazaki et al. .............. 477/20
2013/0253749 A1* 9/2013 Hayashi et al. ................. 701/22

FOREIGN PATENT DOCUMENTS

| JP | 2007-161249 A | 6/2007 |
| JP | 2009-196415 A | 9/2009 |
| JP | 2010-208480 A | 9/2010 |
| WO | 2012/090263 A1 | 7/2012 |

* cited by examiner

ELECTRICALLY-POWERED VEHICLE AND METHOD OF CONTROLLING THE SAME

CROSS REFERENCE TO RELATED APPLICATIONS

This is a National Stage of International Application No. PCT/JP2011/074810 filed Oct. 27, 2011, the contents of which are incorporated herein by reference in its entirety.

TECHNICAL FIELD

The present invention relates to an electrically-powered vehicle and a method of controlling the electrically-powered vehicle, and more particularly to control of a vehicle-driving electric motor mounted in the electrically-powered vehicle.

BACKGROUND ART

In recent years, attention has been given to an electrically-powered vehicle as an environmentally-friendly vehicle, such as an electric vehicle, a hybrid vehicle and a fuel cell vehicle. These electrically-powered vehicles each are equipped with an electric motor (motor generator) generating vehicle driving force and a power storage device for storing electric power supplied to the electric motor. The hybrid vehicle is equipped with an internal combustion engine as a source of motive power in addition to the electric motor, and the fuel cell vehicle is equipped with a fuel cell as a source of DC (direct-current) electric power for driving the vehicle.

In such an electrically-powered vehicle, the driving force (torque) for vehicle running is output by an electric motor. Accordingly, the energy efficiency (fuel efficiency) of the electrically-powered vehicle is to be greatly influenced by control of the electric motor.

Japanese Patent Laying-Open No. 2009-196415 (PTD 1) discloses control performed by a control device of a hybrid vehicle in the case where the temperature of a motor generator exceeds a prescribed reference temperature during execution of a fuel-efficiency priority mode. It specifically discloses that, when the temperature rises, the torque command value of the motor generator is decreased while the decrement of the torque command value is compensated by the torque transmitted from the engine to the drive shaft, thereby preventing overheating of the motor generator while avoiding shortage of the driving force in the entire vehicle. Consequently, the fuel efficiency can be improved without deteriorating the running performance of the vehicle.

Furthermore, Japanese Patent Laying-Open No. 2010-208480 (PTD 2) discloses a hybrid vehicle in which an inverter that controls and drives a motor generator is shut down while the vehicle is stopped and while the engine is under the self-sustained operation in the state where a shift lever is set in a drive position or in a reverse position for vehicle running.

Furthermore, Japanese Patent Laying-Open No. 2007-161249 (PTD 3) discloses control performed for an electric vehicle and a hybrid vehicle for improving the energy efficiency by shutting down an inverter controlling an electric motor that drives driving wheels when the electric motor is controlled to be in a non-driven state.

CITATION LIST

Patent Document

PTD 1: Japanese Patent Laying-Open No. 2009-196415
PTD 2: Japanese Patent Laying-Open No. 2010-208480
PTD 3: Japanese Patent Laying-Open No. 2007-161249

SUMMARY OF INVENTION

Technical Problem

In the fuel-efficiency priority mode of the hybrid vehicle disclosed in PTD 1, since the voltage of a DC power supply is applied as a motor operating voltage without converted to an inverter, the loss of the converter is reduced, thereby allowing improvement in the fuel efficiency. However, since loss power occurs in the inverter for controlling and driving the motor generator, it is feared that there may be a limitation on improvement in fuel efficiency.

In the hybrid vehicle disclosed in PTD 2, in the state where the shift lever is set in the shift position for vehicle running, the inverter of the vehicle-driving motor (MG2) is shut down while the vehicle is stopped and while the engine is under the self-sustained operation, thereby allowing improvement in fuel efficiency. However, since the inverter is shut down only while the vehicle is stopped, it is feared that there may be a limitation on the effect of improving the fuel efficiency. PTD 3 also discloses control for improving the fuel efficiency of an electric vehicle and a hybrid vehicle by shutting down the inverter.

However, when the inverter is shut down, the output torque from the motor generator cannot be used for vehicle running. Accordingly, the problem is depending on in what case the electric motor is brought into a non-driven state and the inverter is shut down in order to prevent an influence from being exerted upon the running performance of the vehicle.

The present invention has been made in order to solve the above-described problems. An object of the present invention is to improve the energy efficiency of an electrically-powered vehicle by reducing the loss due to controlling and driving of a traction motor so as not to affect the running performance of the vehicle.

Solution to Problem

According to an aspect of the present invention, an electrically-powered vehicle includes an electric motor, a first power converter for controlling a torque output from the electric motor, and a control device. The electric motor is configured to output a torque to a drive shaft mechanically coupled to a driving wheel. The control device sets a torque command value of the electric motor such that requested driving force for an entire vehicle is exerted on the drive shaft. The control device includes an electric motor control unit. The electric motor control unit estimates, based on a rotation speed of the electric motor, a magnitude of a drag torque acting as rotational resistance when the electric motor rotates at zero torque, and stops the first power converter in accordance with a difference between the estimated drag torque and the torque command value.

Preferably, the electric motor control unit causes the first power converter to operate irrespective of the difference between the drag torque and the torque command value when the rotation speed of the electric motor is higher than a determination value.

Further preferably, the electrically-powered vehicle further includes a second power converter for controlling a DC (direct-current) voltage on a first power line. The first power converter is configured to perform bidirectional DC/AC (alternating-current) power conversion between the first power line and the electric motor. The determination value is set at a higher rotation speed in accordance with an increase in the DC voltage.

Also preferably, the electrically-powered vehicle further includes an internal combustion engine and a power transmission device. The power transmission device is configured to mechanically transmit a torque originating from an output of the internal combustion engine to the drive shaft. The control device sets an operation command value of the internal combustion engine and the torque command value of the electric motor such that the requested driving force for an entire vehicle is exerted on the drive shaft.

According to another aspect of the present invention, a method of controlling an electrically-powered vehicle equipped with an electric motor configured to output a torque to a drive shaft mechanically coupled to a driving wheel is provided. The method includes the steps of: setting a torque command value of the electric motor such that requested driving force for an entire vehicle is exerted on the drive shaft; estimating, based on a rotation speed of the electric motor, a magnitude of a drag torque acting as rotational resistance when the electric motor rotates at zero torque; and stopping a first power converter for controlling the torque output from the electric motor in accordance with a difference between the estimated drag torque and the torque command value.

Preferably, the control method further includes the step of causing the first power converter to operate irrespective of the difference between the drag torque and the torque command value when the rotation speed of the electric motor is higher than a determination value.

Further preferably, the electrically-powered vehicle further includes a second power converter for controlling a DC voltage on a first power line. The first power converter is configured to perform bidirectional DC/AC power conversion between the first power line and the electric motor. The determination value is set at a higher rotation speed in accordance with an increase in the DC voltage.

Further preferably, the electrically-powered vehicle further includes an internal combustion engine and a power transmission device for mechanically transmitting a torque originating from an output of the internal combustion engine to the drive shaft. The step of setting a torque command value includes the step of setting an operation command value of the internal combustion engine and the torque command value of the electric motor such that the requested driving force for the entire vehicle is exerted on the drive shaft.

Advantageous Effects of Invention

According to the present invention, the energy efficiency of the electrically-powered vehicle can be improved by reducing the loss due to controlling and driving of a traction motor so as not to affect the running performance of the vehicle.

DESCRIPTION OF EMBODIMENTS

Figure 1:
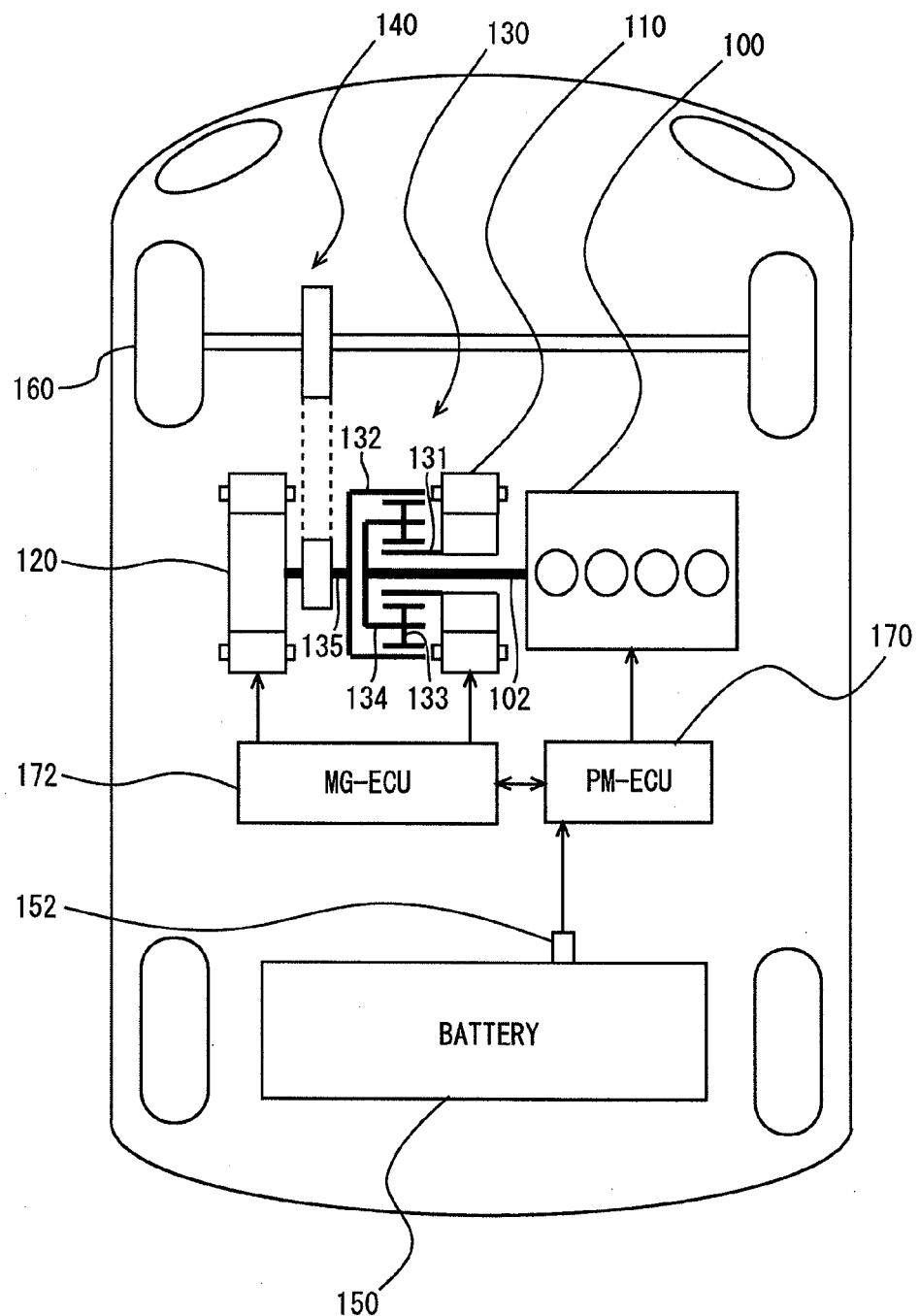
FIG. 1 is a block diagram for illustrating a configuration example of a hybrid vehicle shown as a representative example of an electrically-powered vehicle according to an embodiment of the present invention.

The embodiments of the present invention will be hereinafter described in detail with reference to the accompanying drawings, in which the same or corresponding components are hereinafter designated by the same reference characters, and description thereof will not be basically repeated.

First Embodiment (Vehicle Configuration)

FIG. 1 is a block diagram for illustrating a configuration example of a hybrid vehicle shown as a representative example of an electrically-powered vehicle according to an embodiment of the present invention.

Referring to FIG. 1, a hybrid vehicle includes an engine 100 corresponding to an "internal combustion engine", a first MG (Motor Generator) 110, a second MG 120, a power split device 130, a reduction gear 140, a battery 150, a driving wheel 160, a PM (Power train Manager)-ECU (Electronic Control Unit) 170, and an MG (Motor Generator)-ECU 172.

The hybrid vehicle runs by driving force from at least one of engine 100 and second MG 120. Engine 100, first MG 110 and second MG 120 are coupled to one another via power split device 130.

Power split device 130 is typically formed as a planetary gear mechanism. Power split device 130 includes a sun gear 131 that is an external gear, a ring gear 132 that is an internal gear and disposed concentrically with this sun gear 131, a plurality of pinion gears 133 that engage with sun gear 131 and also with ring gear 132, and a carrier 134. Carrier 134 is configured to hold the plurality of pinion gears 133 in a freely rotating and revolving manner.

Sun gear 131 is coupled to an output shaft of first MG 110. Ring gear 132 is rotatably supported coaxially with a crankshaft 102. Pinion gear 133 is disposed between sun gear 131 and ring gear 132, and revolves around sun gear 131 while rotating on its axis. Carrier 134 is coupled to the end of crankshaft 102 and supports the rotation shaft of each pinion gear 133.

Sun gear 131 and a ring gear shaft 135 rotate as ring gear 132 rotates. The output shaft of second MG 120 is coupled to ring gear shaft 135. Ring gear shaft 135 will be hereinafter also referred to as a drive shaft 135.

In addition, the output shaft of second MG 120 may be configured to be coupled to drive shaft 135 through a transmission. In the present embodiment, since the configuration not provided with a transmission is illustrated, the rotation speed ratio between second MG 120 and ring gear (drive shaft) 135 is 1:1. In contrast, in the configuration provided with a transmission, each of the rotation speed ratio and the torque ratio between drive shaft 135 and second MG 120 is determined by the gear ratio.

Drive shaft 135 is mechanically coupled to driving wheel 160 through reduction gear 140. Accordingly, the motive power output by power split device 130 to ring gear 132, that is, drive shaft 135, is to be output to driving wheel 160 through reduction gear 140. Although front wheels are used as driving wheels 160 in the example shown in FIG. 1, rear wheels may be used as driving wheels 160 or front wheels and rear wheels may be used as driving wheels 160.

Power split device 130 executes a differential action using sun gear 131, ring gear 132 and carrier 134 each as a rotating element. These three rotating elements are mechanically coupled to three shafts including crankshaft 102 of engine 100, the output shaft of first MG 110 and drive shaft 135. Also, power split device 130 is configured such that when the rotation speeds of any two shafts of these three shafts are determined, the rotation speed of remaining one shaft is determined, and also configured to, based on the motive power input to and output from any two shafts of these three shafts, input and output the motive power to and from remaining one shaft.

The motive power generated by engine 100 is split into two paths by power split device 130. One of the paths serves to drive driving wheel 160 through reduction gear 140 while the other of the paths serves to drive first MG 110 to generate electric power. When first MG 110 functions as a power generator, power split device 130 distributes the motive power, which is input from engine 100 through carrier 134, to the sun gear 131 side and the ring gear 132 side in accordance with the gear ratio. On the other hand, when first MG 110 functions as an electric motor, power split device 130 combines the motive power input from engine 100 through carrier 134 and the motive power input from first MG 110 through sun gear 131, and outputs the combined power to ring gear 132. In this way, power split device 130 functions as a "power transmission device" for mechanically transmitting, to drive shaft 135, the torque originating from the output of engine 100.

First MG 110 and second MG 120 each are representatively a three-phase alternating-current (AC) rotating electric machine formed of a permanent magnet motor.

First MG 110 can mainly operate as a "power generator" to generate electric power by the driving force from engine 100 split by power split device 130. The electric power generated by first MG 110 is variously used in accordance with the running state of the vehicle and the conditions of an SOC (State of Charge) of battery 150. For example, at the time of the normal running of the vehicle, the electric power generated by first MG 110 is used as electric power for driving second MG 120. On the other hand, when the SOC of battery 150 is lower than a predetermined value, the electric power generated by first MG 110 is converted from the alternating current into a direct current by an inverter described later. Then, this electric power is stored in battery 150 after its voltage is adjusted by a converter described later. In addition, in the case of motoring engine 100 at start-up of the engine, and the like, first MG 110 can also operate as an electric motor under the torque control.

Second MG 120 mainly operates as an "electric motor" and is driven by at least one of the electric power stored in battery 150 and the electric power generated by first MG 110. The motive power generated by second MG 120 is transmitted to drive shaft 135, and further transmitted to driving wheel 160 through reduction gear 140. Accordingly, second MG 120 assists engine 100, or causes the vehicle to run with the driving force from second MG 120.

During regenerative braking of a hybrid vehicle, second MG 120 is driven by driving wheel 160 through reduction gear 140. In this case, second MG 120 operates as a power generator. Accordingly, second MG 120 functions as a regenerative brake that converts braking energy into electric power. The electric power generated by second MG 120 is stored in battery 150.

Battery 150 serves as a battery pack having a configuration in which a plurality of battery modules each having a plurality of battery cells integrated with each other are connected in series. The voltage of battery 150 is approximately 200V, for example. Battery 150 can be charged with electric power generated by first MG 110 or second MG 120. The temperature, voltage and current of battery 150 are detected by a battery sensor 152. A temperature sensor, a voltage sensor and a current sensor are comprehensively indicated as battery sensor 152.

The charge power to battery 150 is limited so as not to exceed an upper limit value WIN. Similarly, the discharge power of battery 150 is limited so as not to exceed an upper limit value WOUT. Upper limit values WIN and WOUT are determined based on various parameters such as the SOC, the temperature, the change rate of the temperature and the like of battery 150.

PM-ECU 170 and MG-ECU 172 each are configured to incorporate a CPU (Central Processing Unit) and a memory which are not shown, and to perform operation processing based on the value detected by each sensor by means of software processing in accordance with the map and program stored in the memory. Alternatively, at least a part of the ECU may be configured to perform prescribed numerical operation processing and/or logical operation processing by means of hardware processing by a dedicated electronic circuit and the like.

Engine 100 is controlled in accordance with an operation command value from PM (Power train Manager)-ECU (Electronic Control Unit) 170. First MG 110 and second MG 120 are controlled by MG-ECU 172. PM-ECU 170 and MG-ECU 172 are connected so as to allow bidirectional communication with each other. PM-ECU 170 generates an operation command value for each of engine 100, first MG 110 and second MG 120 by running control which will be described later.

Then, MG-ECU 172 controls the operation of each of first MG 110 and second MG 120 in accordance with the operation command value transmitted from PM-ECU 170. MG-ECU 172 executes a function of an "electric motor control unit". In addition, engine 100 controls fuel injection quantity, ignition timing and the like in accordance with the operation command value (representatively, a torque command value and a rotation speed command value) from PM-ECU 170.

Although PM-ECU 170 and MG-ECU 172 are formed of separate ECUs in the present embodiment, a single ECU comprehensively having both functions of these ECUs may be provided.

Figure 2:
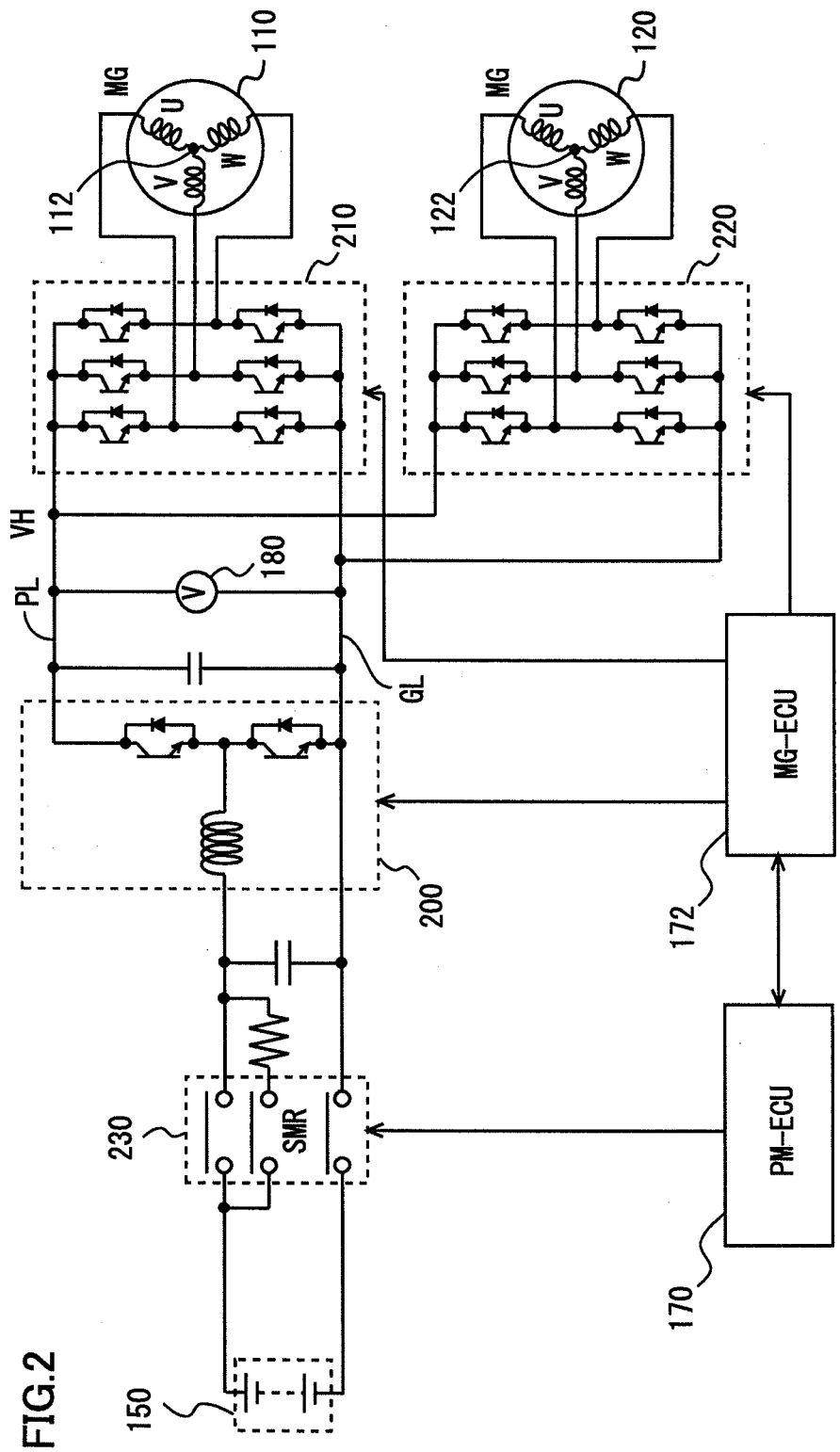
FIG. 2 is a circuit diagram illustrating a configuration example of an electrical system of the hybrid vehicle shown in FIG. 1.

FIG. 2 is a circuit diagram illustrating a configuration example of an electrical system of the hybrid vehicle shown in FIG. 1.

Referring to FIG. 2, the electrical system of the hybrid vehicle is provided with a converter 200, an inverter 210 corresponding to first MG 110, an inverter 220 corresponding to second MG 120, and an SMR (System Main Relay) 230. Inverter 220 corresponds to the "first power converter" while converter 200 corresponds to the "second power converter".

Converter 200 includes a reactor, two power semiconductor switching elements (which will be also simply referred to as a "switching element") connected in series and, an antiparallel diode provided corresponding to each switching element.

As a power semiconductor switching element, an IGBT (Insulated Gate Bipolar Transistor), a power MOS (Metal Oxide Semiconductor) transistor, a power bipolar transistor, and the like may be used as appropriate. The reactor has one end connected to battery 150 on its positive pole and the other end connected to the connection point between two switching elements. Each switching element is controlled by MG-ECU 170 to be turned on or off.

When the electric power discharged from battery 150 is supplied to first MG 110 or second MG 120, the voltage is raised by converter 200. In contrast, when battery 150 is charged with the electric power generated by first MG 110 or second MG 120, the voltage is lowered by converter 200.

Converter 200, inverter 210 and inverter 220 are electrically connected to one another through a power line PL and a ground line GL. A DC voltage VH on power line PL is detected by a voltage sensor 180. The results detected by voltage sensor 180 are transmitted to MG-ECU 172.

Inverter 210 is formed of a commonly-used three-phase inverter, and includes a U-phase arm, a V-phase arm and a W-phase arm that are connected in parallel. Each of the U-phase arm, the V-phase arm and the W-phase arm has two switching elements (an upper arm element and a lower arm element) connected in series. An antiparallel diode is connected to each switching element.

First MG 110 has a U-phase coil, a V-phase coil and a W-phase coil coupled in a star connection as a stator winding. Each phase coil has one end mutually connected at a neutral point 112 and also has the other end connected to a connection point between the switching elements of each phase arm of inverter 210.

During vehicle running, inverter 210 controls the current or voltage of each phase coil of first MG 110 such that first MG 110 operates in accordance with the operation command value (representatively, a torque command value) set for generating the driving force (vehicle driving torque, power generation torque, and the like) requested for vehicle running. In other words, inverter 210 performs bidirectional DC/AC power conversion between power line PL and first MG 110.

As with inverter 210, inverter 220 is formed of a commonly-used three-phase inverter. As with first MG 110, second MG 120 has a U-phase coil, a V-phase coil and a W-phase coil coupled in a star connection as a stator winding. Each phase coil has one end mutually connected at a neutral point 122 and also has the other end connected to a connection point between the switching elements of each phase arm of inverter 220.

During vehicle running, inverter 220 controls the current or voltage of each phase coil of second MG 120 such that second MG 120 operates in accordance with the operation command value (representatively, a torque command value) set for generating the driving force (vehicle driving torque, regenerative braking torque, and the like) requested for vehicle running. In other words, inverter 220 performs bidirectional DC/AC power conversion between power line PL and second MG 120.

In addition, for example, PWM (Pulse Width Modulation) control is used for controlling first MG 110 and second MG 120 by inverters 210 and 220, respectively. Since a well-known and commonly-used technique only has to be employed for PWM control, further detailed description thereof will not be repeated. MG-ECU 172 generates a driving signal for controlling the switching elements forming each of inverters 210 and 220 to be turned on or off in accordance with PWM control. In other words, during operation of inverters 210 and 220, switching loss occurs as each switching element is turned on or off.

An SMR 230 is provided between battery 150 and converter 200. When SMR 230 is opened, battery 150 is cut off from the electrical system. On the other hand, when SMR 230 is closed, battery 150 is connected to the electrical system. The state of SMR 230 is controlled by PM-ECU 170. For example, SMR 230 is closed in response to the operation of turning on a power-on switch (not shown) that instructs system startup of the hybrid vehicle while SMR 230 is opened in response to the operation of turning off the power-on switch.

Figure 3:
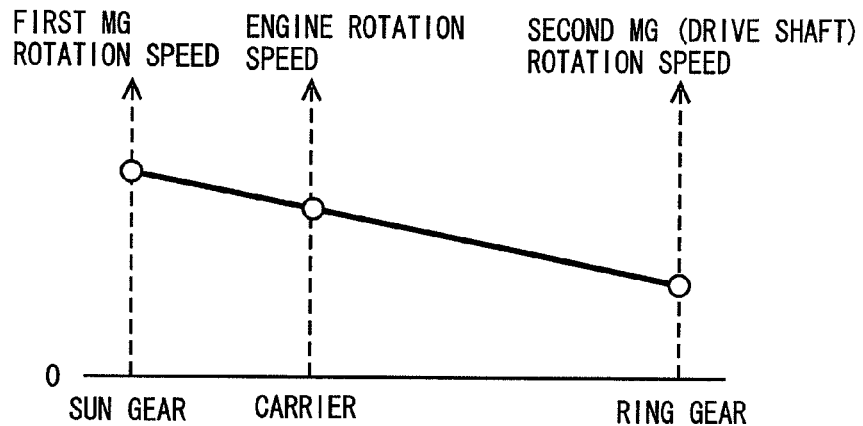
FIG. 3 is a collinear diagram showing the relation of the rotation speeds among an engine, the first MG and the second MG in the hybrid vehicle shown in FIG. 1.

As described above, in the hybrid vehicle shown in FIG. 1, engine 100, first MG 110 and second MG 120 are coupled via a planetary gear. This establishes a relation in which the rotation speeds of engine 100, first MG 110 and second MG 120 are connected with a straight line in a collinear diagram, as shown in FIG. 3.

Figure 4:
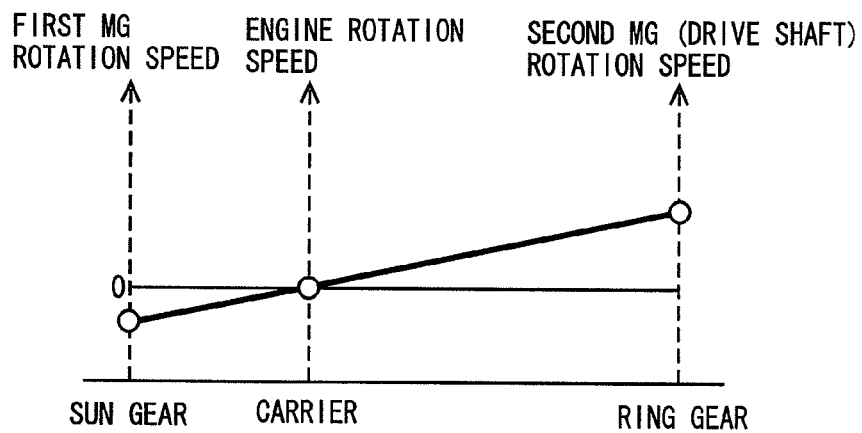
FIG. 4 is a collinear diagram during EV (Electric Vehicle) running of the hybrid vehicle shown in FIG. 1.

According to the hybrid vehicle, PM-ECU 170 executes running control for allowing vehicle running suitable for the vehicle state. For example, at the start of the vehicle and during low speed running, the hybrid vehicle runs with the output from second MG 120 in the state where engine 100 is stopped, as in the collinear diagram shown in FIG. 4. In this case, the rotation speed of second MG 120 is rendered positive while the rotation speed of first MG 110 is rendered negative.

Figure 5:
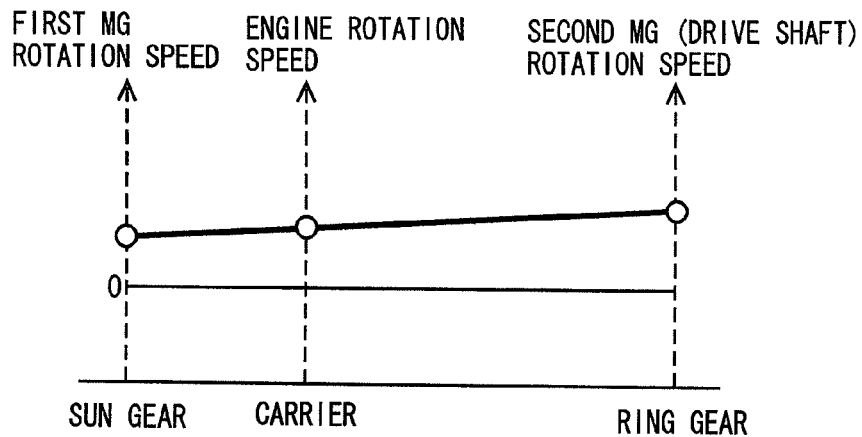
FIG. 5 is a collinear diagram at the start of the engine of the hybrid vehicle shown in FIG. 1.

During steady running, as in the collinear diagram shown in FIG. 5, the rotation speed of first MG 110 is rendered positive by operating first MG 110 as a motor such that engine 100 is cranked using first MG 110. In this case, first MG 110 operates as an electric motor. Then, engine 100 is started to cause the hybrid vehicle to run with the outputs from engine 100 and second MG 120. As will be described later in detail, a hybrid vehicle is improved in fuel efficiency by operating engine 100 at a highly-efficient operating point.

(Control Structure)

Figure 6:
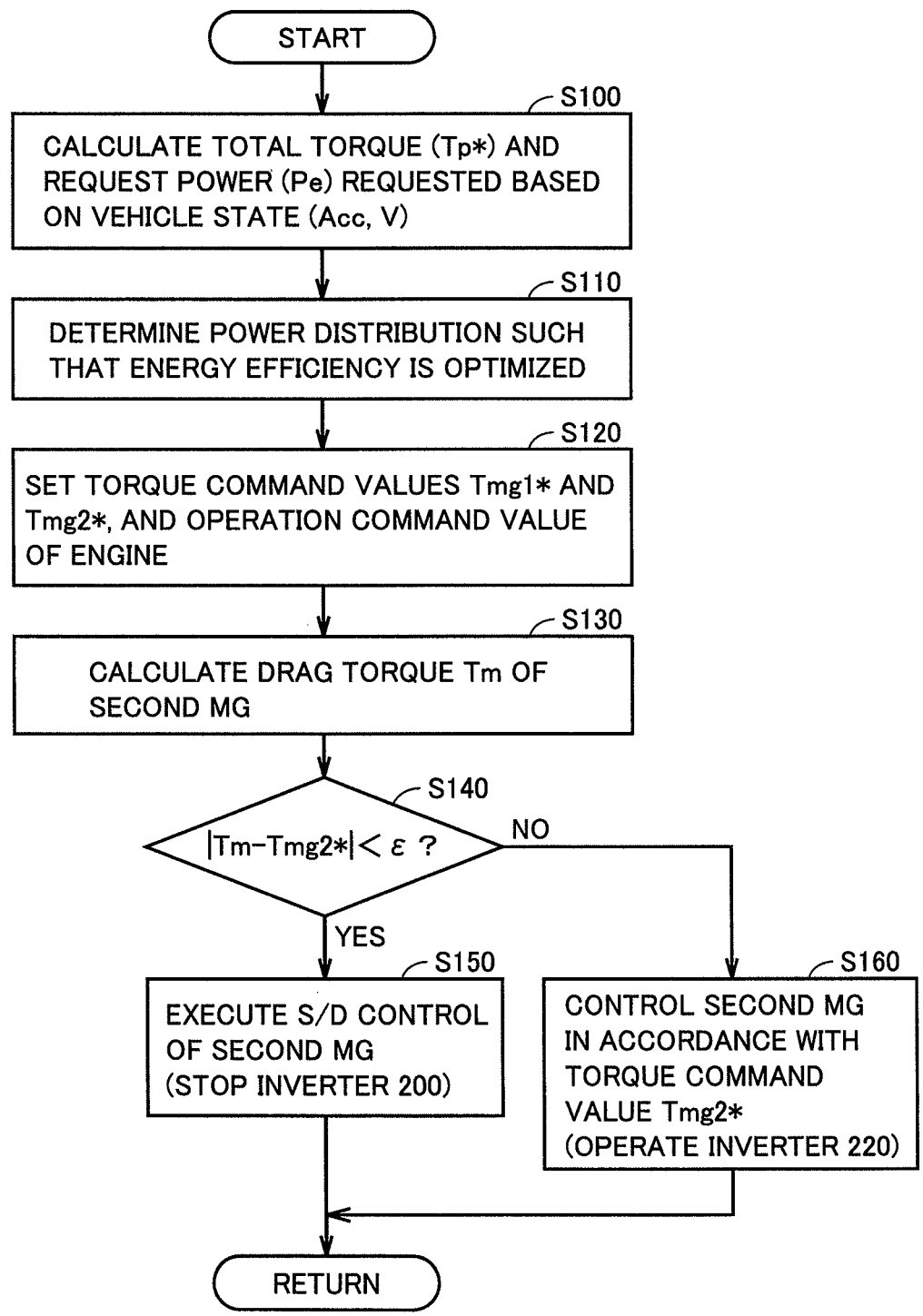
FIG. 6 is a flowchart illustrating the controlling process related to control of second MG 120, which is included in the running control for the electrically-powered vehicle according to the first embodiment of the present invention.

The running control for the electrically-powered vehicle according to the embodiment of the present invention will be hereinafter described in detail. FIG. 6 particularly shows a part related to control for second MG 120 serving as a vehicle-driving electric motor, which is included in running control for the electrically-powered vehicle according to the first embodiment of the present invention. The controlling process in accordance with the flowchart shown in FIG. 6 is, for example, performed by PM-ECU 170 and MG-ECU 172 (both of which will be comprehensively referred to simply as an ECU) shown in FIG. 1 for each prescribed control cycle.

Referring to FIG. 6, in step S100, the ECU calculates total driving force required in the entire vehicle based on the vehicle state detected based on the sensor output signal. Then, in order to generate this total driving force, the ECU calculates a requested driving force Tp* that is to be output to drive shaft 135. The vehicle state reflected in calculation of the driving force typically includes an accelerator pedal position Acc showing the accelerator pedal operation amount by the user and a vehicle speed V of the hybrid vehicle.

For example, the ECU stores, in the memory, a map (not shown) in which the relation among accelerator pedal position Acc, vehicle speed V and requested driving force Tp* is set in advance. Then, when accelerator pedal position Acc and vehicle speed V are detected, the ECU can calculate requested driving force Tp* by referring to this map.

In this way, by adding the torque corresponding to requested driving force Tp* to drive shaft 135, the hybrid vehicle can generate appropriate vehicle driving force in accordance with the vehicle state. In the following, requested driving force Tp* will also be referred to as a total torque Tp*.

Furthermore, in step S100, request power Pe for the entire vehicle is calculated from total torque Tp*. Charge/discharge request power Pchg for charging/discharging battery 150 is reflected in request power Pe. Charge/discharge request power Pchg is set to establish a condition that Pchg>0, when battery 150 needs to be charged in accordance with the state (SOC) of battery 150. On the other hand, when battery 150 is excessively charged and to be discharged, charge/discharge request power Pchg is set to establish a condition that Pchg<0.

In step S110, the ECU determines power distribution in accordance with request power Pe calculated in step S100 such that the energy efficiency for the entire vehicle is maximized. Thereby, the output distribution between the engine and second MG 120 is determined.

In step S120, the ECU sets a torque command value Tmg1* of first MG 110, a torque command value Tmg2* of second MG 120, and an operation command value of engine 100 in accordance with the power distribution determined in step S110.

For example, a target operating point (torque/rotation speed) of engine 100 is determined in accordance with the power distribution determined in step S110. The operation command value of engine 100 is set in accordance with this target operating point.

Furthermore, as shown in the collinear diagram of FIG. 3, the rotation speed of engine 100 can be changed in accordance with the rotation speed of first MG 110. Therefore, a target rotation speed Nmg1* of first MG 110 can be determined according to the following equation (1) by using gear ratio ρ and drive shaft rotation speed Nr of power split device 130.

$$Nmg1^* = (Ne^* \cdot (1+\rho) - Nr)/\rho \quad (1)$$

Torque command value Tmg1* of first MG 110 is set such that first MG 110 rotates at target rotation speed Nmg1*. For example, torque command value Tmg1* can be set according to the following equation (2) so as to sequentially correct torque command value Tmg1* based on the deviation between actual rotation speed Nmg1 and target rotation speed Nmg1* of first MG 110 (ΔNmg1=Nmg1*−Nmg1). In addition, the second term on the right-hand side in the equation (2) shows the calculation result of a PID (Proportional Integral Differential) control based on deviation ΔNmg1.

$$Tmg1^* = Tmg1^*(\text{previous value}) + PID(\Delta Nmg1) \quad (2)$$

When first MG 110 is controlled in accordance with torque command value Tmg1*, an engine direct torque Tep (=−Tmg1*/ρ) is exerted on ring gear 132 (drive shaft 135). Engine direct torque Tep corresponds to the torque transmitted to ring gear 132 at the time when engine 100 is operated at each of target rotation speed Ne* and target torque Te* while first MG 110 receives reaction force.

The output torque of second MG 120 is exerted on ring gear 132 (drive shaft 135). Accordingly, total torque Tp* can be ensured by setting the output torque of second MG 120 so as to compensate for the excessive or insufficient amount of engine direct torque Tep relative to total torque Tp*.

Accordingly, torque command value Tmg2* of second MG 120 is calculated according to the following equation (3). When a transmission is connected between second MG 120 and drive shaft 135, the equation (3) only has to be further multiplied by the gear ratio.

$$Tmg2^* = (Tp^* - Tep/\rho) \quad (3)$$

Furthermore, the ECU calculates a drag torque Tm of second MG 120 in step S130. Drag torque Tm shows a magnitude of a torque acting as rotational resistance when second MG 120 rotates at an output torque=0.

Typically, the mechanical loss to rotational movement caused by a bearing and the like is exerted as rotational resistance. The torque caused by such mechanical loss changes depending on the rotation speed of second MG 120. Furthermore, when second MG 120 is a permanent magnet motor, counter-electromotive force is generated by a permanent magnet attached to a rotor. Accordingly, an electromagnetic drag torque resulting from this counter-electromotive force is generated. Since the counter-electromotive force generated in second MG 120 is determined by the product of the rotation angle speed and the interlinkage flux of second MG 120, the electromagnetic drag torque also changes depending on the rotation speed of second MG 120. In this way, it is understood that a mechanical drag torque or an electromagnetic drag torque is a function of rotation speed Nmg2 of second MG 120.

Figure 7:
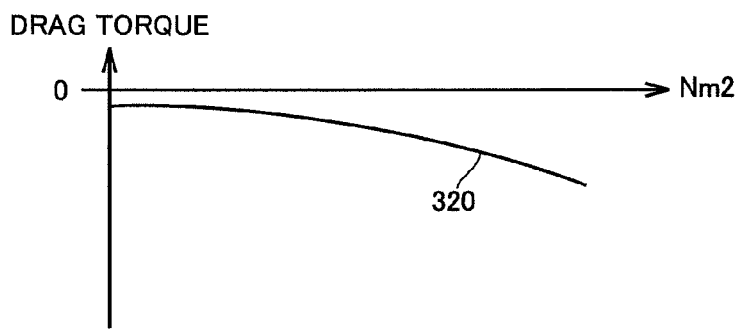
FIG. 7 is a conceptual diagram showing an example of a calculation map of a drag torque.

Therefore, as shown in FIG. 7, by measuring the corresponding relation of drag torque Tm to second MG rotation speed Nmg2 in advance by experiments or the like, a map 320 based on the experimental results can be produced in advance. Alternatively, map 320 may be learned on-line based on the actual measurement value during vehicle running. In addition, when a transmission is disposed between second MG 120 and drive shaft 135, the converted value to the drive shaft torque in consideration of the gear ratio of the transmission is assumed to be a map value of drag torque Tm.

Again referring to FIG. 6, in step S140, the ECU compares torque command value Tmg2* of second MG 120 and drag torque Tm calculated in step S130. For example, in step S140, it is determined whether the difference between the torque command value and the drag torque is smaller than a prescribed value c.

Figure 8:
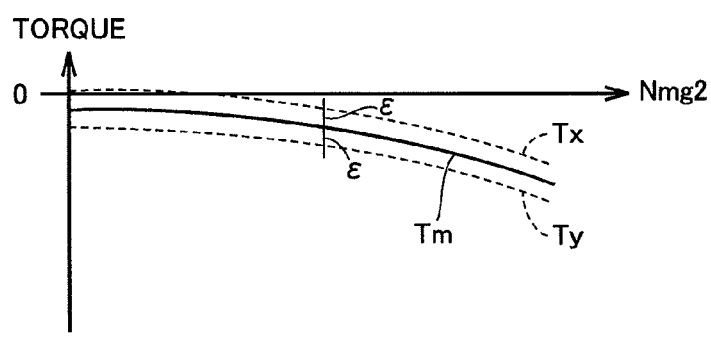
FIG. 8 is a conceptual diagram illustrating a condition for executing shutdown control.

Referring to FIG. 8, in accordance with MG2 rotation speed Nmg2, a torque range Tx to Ty is set, in which the torque difference falls within c with respect to drag torque Tm calculated by map 320 (FIG. 7). Accordingly, in step S140, it is determined whether torque command value Tmg2* falls within the range between Tx and Ty, which corresponds to MG2 rotation speed Nmg2.

Again referring to FIG. 6, when the difference between torque command value Tmg2* and drag torque Tm is relatively small (when determined as YES in S140), the ECU proceeds the process to step S150.

In step S150, shutdown control (which will be hereinafter also described as S/D control) of second MG 120 is executed. During execution of S/D control, the operation of inverter 220 is stopped to fix each switching element forming inverter 220 to be turned off. This results in unloaded rotation of second MG 120 without outputting a torque. Accordingly, the torque corresponding to drag torque Tm is to act on drive shaft 135 coupled to second MG 120.

Therefore, it can be understood that, in the state where the output torque of second MG 120 is controlled to be equivalent to drag torque Tm by running control, the torque acting on drive shaft 135, that is, vehicle driving force, does not greatly change even if second MG 120 is shut down. Accordingly, by applying S/D control to thereby reduce the power loss in inverter 220, the energy efficiency can be improved without causing a change in the vehicle driving force.

On the other hand, when S/D control is applied in the case where the difference between torque command value Tmg2* and drag torque Tm of second MG 120 is relatively large, the vehicle driving force changes in response to shutdown of inverter 220. Accordingly, when the difference between torque command value Tmg2* and drag torque Tm is not relatively small (when determined as NO in S140), the ECU proceeds the process to step S160, and controls second MG 120 in accordance with torque command value Tmg2*.

In other words, S/D control is not executed and inverter 220 is operated. Consequently, by controlling the switching elements forming inverter 220 to be turned on or off, power conversion by inverter 220 for controlling the output torque of second MG 120 is performed.

In this way, according to the running control of the electrically-powered vehicle in the present first embodiment, S/D control is performed to stop inverter 220 when the output torque of second MG 120 for generating request driving force (total torque Tp*) for the entire vehicle is equivalent to drag torque Tm of second MG 120.

For example, during deceleration regeneration (low rotation region) and during high-speed steady running (middle to high rotation regions) in the mode running, there tends to occur frequently, a state where the output torque of second MG 120 (torque command value Tmg2*) becomes approximately equal to drag torque Tm. By actively performing S/D control in such a state, the power loss can be suppressed to allow improvement in energy efficiency of the vehicle without causing a change in the vehicle driving force.

Second Embodiment

The description has been made in the first embodiment with regard to control for improving the fuel efficiency by actively applying S/D control when the difference between the torque command value and the drag torque of second MG 120 is relatively small. However, since drag torque Tm is generally a negative torque, second MG 120 performs regenerative power generation in the case where S/D control is applied. Accordingly, depending on the conditions, by causing second MG 120 to output a regenerative torque equivalent to the drag torque, the energy efficiency may be improved more. In the second embodiment, a description will be made with regard to the running control for improving the energy efficiency of the electrically-powered vehicle by considering such regeneration conditions.

Figure 9:
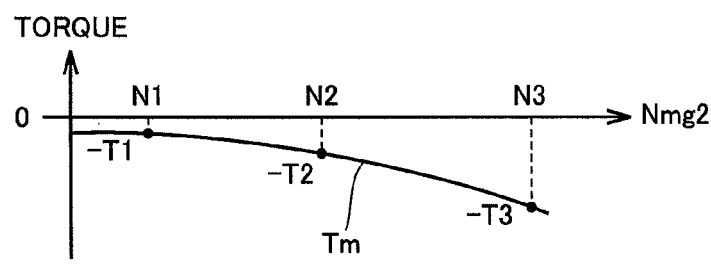
FIG. 9 is the first conceptual diagram for illustrating the power balance in the case where the second MG generates a torque equivalent to a drag torque.
Figure 10:
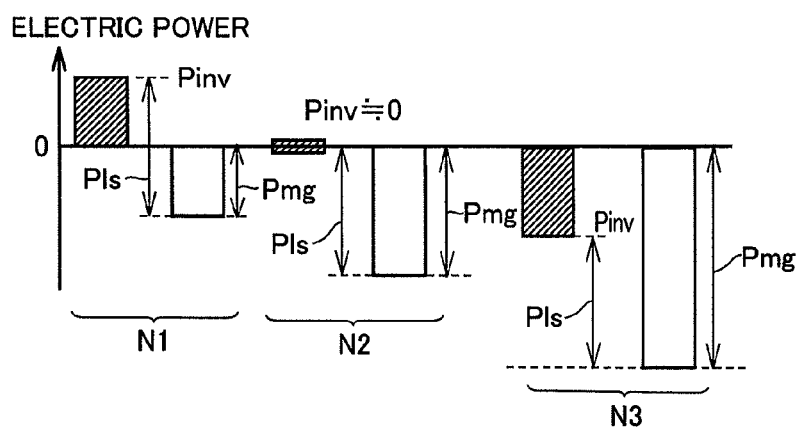
FIG. 10 is the second conceptual diagram for illustrating the power balance in the case where the second MG generates a torque equivalent to a drag torque.

FIGS. 9 and 10 each are a conceptual diagram for illustrating the power balance in the case where second MG 120 generates a torque equivalent to the drag torque.

FIG. 9 shows the cases where drag torque Tm=−T1 at the time when MG2 rotation speed Nmg2=N1; Tm=−T2 at the time when Nmg2=N2; and Tm=−T3 at the time when Nmg2=N3. It is understood that the higher the MG2 rotation speed Nmg2 is, the greater the absolute value of drag torque Tm is, that is, T1<T2<T3.

FIG. 10 shows the power balance in each of the cases where Nmg2=N1, Nmg2=N2, and Nmg2=N3. In FIG. 10, Pls shows the loss power at the time when inverter 220 operates; and Pmg shows generated electric power at the time when second MG 120 is controlled by inverter 220 to generate a negative torque equivalent to the drag torque. Furthermore, Pinv is input power on the DC side of inverter 220. When Pinv>0, electric power is input from battery 150 into inverter 220. On the other hand, when Pinv<0, electric power is output from inverter 220 to battery 150.

When Nmg2=N1 (low rotation region), loss power Pls of inverter 220 becomes greater than generated electric power Pmg of second MG 120. This results in a condition that inverter's input power Pinv>0, and therefore, the electric power of battery 150 is consumed.

On the other hand, when Nmg2=N3 (high rotation region), generated electric power Pmg of second MG 120 is greater than loss power Pls of inverter 220. This results in a condition that inverter's input power Pinv<0, and therefore, battery 150 can be charged with regenerative power of second MG 120.

Also, it can be understood that, between the low rotation region and the high rotation region, there exists rotation speed N2 at which loss power Pls of the inverter and generated electric power Pmg of second MG 120 are brought into balance such that input power Pinv of the inverter becomes approximately zero.

In other words, in the region where Nmg2>N2 in which rotation speed N2 is set as a threshold value, battery 150 can be charged with the recovered regenerative energy by operating second MG 120 so as to output drag torque Tm. Accordingly, it is more disadvantageous in terms of energy efficiency that S/D control is performed to stop inverter 220.

On the other hand, in the region where Nmg2<N2, when second MG 120 is operated so as to output drag torque Tm, inverter 220 undergoes loss power greater than the electric power generated by second MG 120. Accordingly, it is more advantageous in terms of energy efficiency that S/D control is performed to stop inverter 220.

Figure 11:
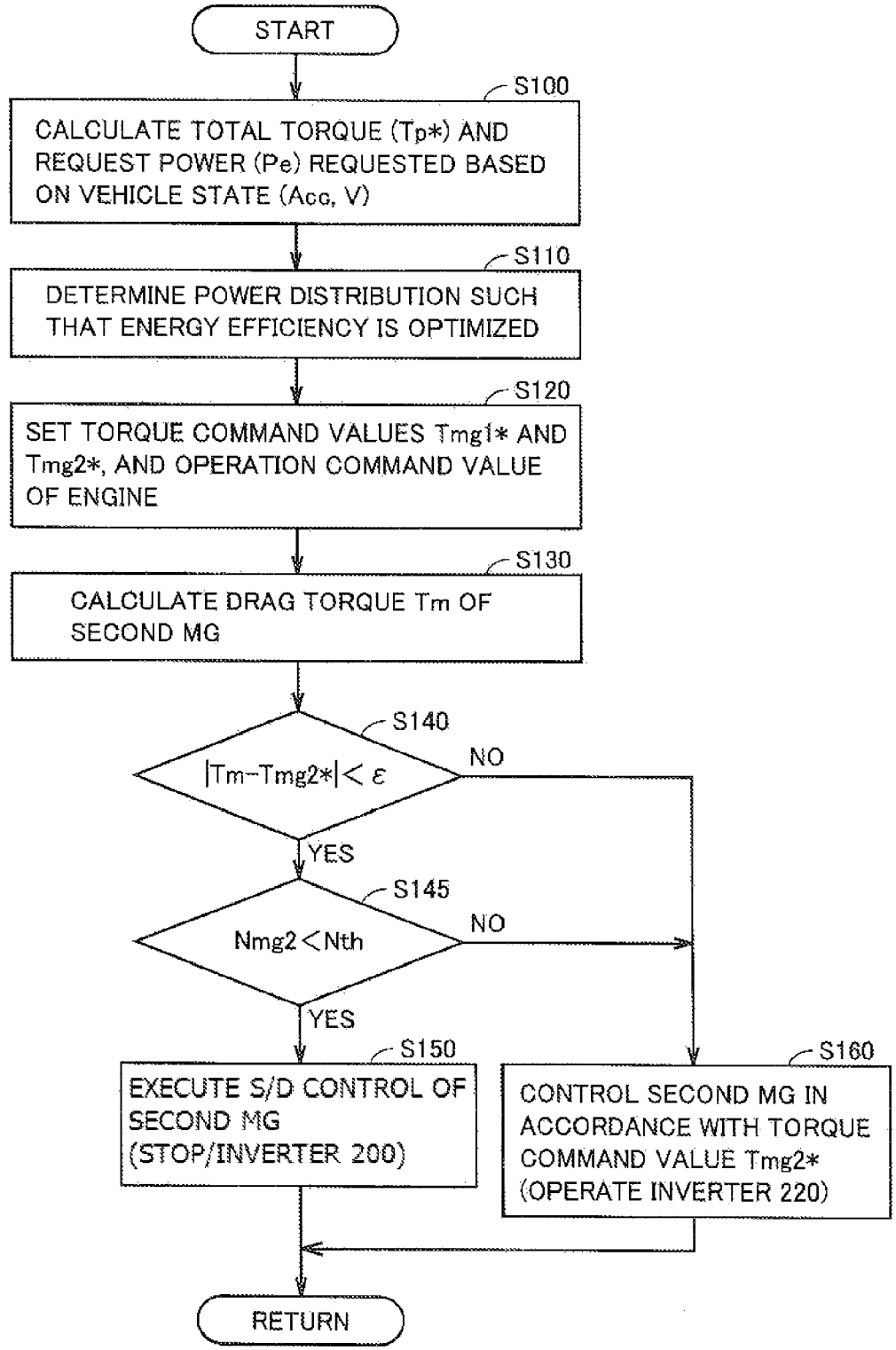
FIG. 11 is a flowchart illustrating a controlling process related to control of second MG 120, which is included in the running control for an electrically-powered vehicle according to the second embodiment of the present invention.

FIG. 11 is a flowchart illustrating a controlling process of second MG 120, which is included in the running control for the electrically-powered vehicle according to the second embodiment of the present invention. The controlling process in accordance with the flowchart shown in FIG. 11 is, for example, performed by the ECU (PM-ECU 170 and MG-ECU 172) for each prescribed control cycle.

Referring to FIG. 11, the ECU performs steps S100 to S130 similar to those in FIG. 6. Thereby, based on the running control in accordance with the vehicle state, the operation command value of engine 100, and torque command values Tmg1* and Tmg2* are determined while drag torque Tm at the present MG2 rotation speed Nmg2 is calculated. Furthermore, torque command value Tmg2* and drag torque Tm are compared in step S140 similar to that in FIG. 6.

The ECU further performs determination in step S145 when the difference between torque command value Tmg2* and drag torque Tm is relatively small (when determined as YES in S140).

In step S145, the ECU compares the present MG2 rotation speed Nmg2 with a determination value Nth. Determination value Nth is set in accordance with MG2 rotation speed at which Pinv=0 in FIGS. 9 and 10 (N2 in FIGS. 9 and 10).

When it is determined as YES in both of steps S140 and S145, the ECU proceeds the process to step S150 similar to that in FIG. 6, to perform S/D control. On the other hand, even when it is determined as YES in step S140, but when it is determined as NO in step S145, the ECU proceeds the process to step S160 so as not to perform S/D control. Accordingly, the charge power of battery 150 is to be output from inverter 220 as in the case where Nmg2=N3 in FIG. 10.

In addition, in the configuration in which converter 200 variably controls voltage VH on the DC side of inverter 220 as shown in FIG. 2, the loss power caused during the operation of inverter 220 changes in accordance with DC voltage VH.

Figure 12:
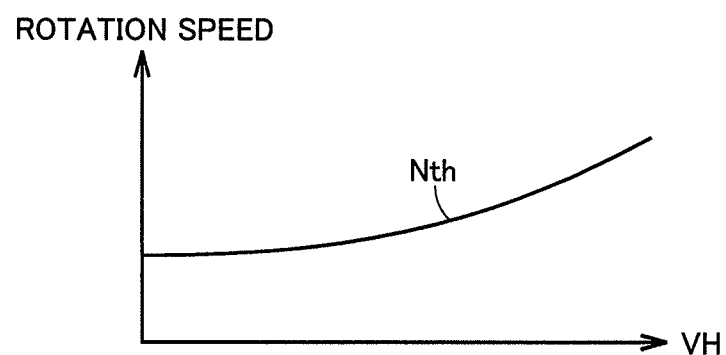
FIG. 12 is a conceptual diagram illustrating the relation between a voltage on the inverter's DC side and a determination value used for determining whether shutdown control is required or not.

Accordingly, it is preferable that determination value Nth is changed in accordance with voltage VH on the DC side (input voltage) of inverter 220, as shown in FIG. 12.

Specifically, it is understood that since loss power Pls of the inverter is increased as DC voltage VH rises, rotation speed N2 set as a threshold value at which Pinv=0 is shifted to the high rotation side. Accordingly, by increasing determination value Nth in accordance with an increase in DC voltage VH, it becomes possible to more accurately determine as to whether execution of S/D control is appropriate or not for MG2 rotation speed.

In this way, according to the electrically-powered vehicle in the second embodiment, in addition to the effect achieved in the electrically-powered vehicle according to the first embodiment, regenerative energy can be actively recovered without performing S/D control in the high rotation region. Therefore, the energy efficiency can be further improved.

As has been confirmatively described, in the driveline of the electrically-powered vehicle, S/D control according to the present embodiment can be applied also to the configuration different from that of the hybrid vehicle illustrated in FIG. 1. Specifically, including a series-type or parallel-type hybrid vehicle, the present invention can be applied also to other types of hybrid vehicle, as well as an electric vehicle and a fuel cell vehicle that are not equipped with an engine. Specifically, when the torque command value of the vehicle-driving electric motor is equal to the drag torque at the present rotation speed (the torque during unloaded rotation), S/D control for shutting down a power converter for driving the electric motor (to stop switching) can also be applied irrespective of the number of electric motors (motor generators) to be arranged and the configuration of the power transmission device.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

INDUSTRIAL APPLICABILITY

The present invention can be applied to an electrically-powered vehicle equipped with a power converter for controlling a vehicle-driving electric motor.

REFERENCE SIGNS LIST

100 engine, 102 crankshaft, 112, 122 neutral point, 130 power split device, 131 sun gear, 132 ring gear, 133 pinion gear, 134 carrier, 135 ring gear shaft (drive shaft), 140 reduction gear, 150 battery, 152 battery sensor, 160 driving wheel, 180 voltage sensor, 200 converter, 210, 220 inverter, 320 map (drag torque), GL ground line, Nmg1, Nmg2 MG rotation speed, Nth determination value, PL power line, Pinv inverter input power, Pls inverter loss power, Tx to Ty torque range (execution of S/D control), Tm drag torque, Tmg1* torque command value (first MG), Tmg2* torque command value (second MG), Tp* total torque (request driving force), VH DC voltage (voltage on the inverter's DC side), WIN, WOUT upper limit value (charge/discharge electric power).

The invention claimed is:

1. An electrically-powered vehicle comprising:
    an electric motor configured to output a torque to a drive shaft mechanically coupled to a driving wheel;
    a first power converter for controlling the torque output from said electric motor; and
    a control device for setting a torque command value of said electric motor such that requested driving force for an entire vehicle is exerted on said drive shaft,
    said control device including an electric motor control unit for estimating, based on a rotation speed of said electric motor, a magnitude of a drag torque acting as rotational resistance when said electric motor rotates at zero torque, and stopping said first power converter when the estimated magnitude of said drag torque is substantially the same as said torque command value.

2. The electrically-powered vehicle according to claim 1, wherein said electric motor control unit causes:
    said first power converter to stop when the estimated magnitude of said drag torque is substantially the same as said torque command value and the rotation speed of said electric motor is lower than a determination value; and
    said first power converter to operate irrespective of the difference between said drag torque and said torque command value when the rotation speed of said electric motor is higher than a determination value.

3. The electrically-powered vehicle according to claim 2, further comprising a second power converter for controlling a DC voltage on a first power line, wherein
    said first power converter is configured to perform bidirectional DC/AC power conversion between said first power line and said electric motor, and
    said determination value is set at a higher rotation speed in accordance with an increase in said DC voltage.

4. The electrically-powered vehicle according to claim 1, further comprising:
    an internal combustion engine; and
    a power transmission device for mechanically transmitting a torque originating from an output of said internal combustion engine to said drive shaft, wherein
    said control device sets an operation command value of said internal combustion engine and said torque command value of said electric motor such that the requested driving force for an entire vehicle is exerted on said drive shaft.

5. A method of controlling an electrically-powered vehicle equipped with an electric motor configured to output a torque to a drive shaft mechanically coupled to a driving wheel, said method comprising:
    the step of setting a torque command value of said electric motor such that requested driving force for an entire vehicle is exerted on said drive shaft;
    the step of estimating, based on a rotation speed of said electric motor, a magnitude of a drag torque acting as rotational resistance when said electric motor rotates at zero torque; and
    the step of stopping a first power converter for controlling the torque output from said electric motor when the estimated magnitude of said drag torque is substantially the same as said torque command value.

6. The method of controlling an electrically-powered vehicle according to claim 5, wherein
    said first power converter is caused to stop when the estimated magnitude of said drag torque is substantially the same as said torque command value and the rotation speed of said electric motor is lower than a determination value; and
    said first power converter is caused to operate irrespective of the difference between said drag torque and said torque command value when the rotation speed of said electric motor is higher than a determination value.

7. The method of controlling an electrically-powered vehicle according to claim 6, wherein
- said electrically-powered vehicle further includes a second power converter for controlling a DC voltage on a first power line,
- said first power converter is configured to perform bidirectional DC/AC power conversion between said first power line and said electric motor, and
- said determination value is set at a higher rotation speed in accordance with an increase in said DC voltage.

8. The method of controlling an electrically-powered vehicle according to claim 5, wherein
- said electrically-powered vehicle further includes an internal combustion engine and a power transmission device for mechanically transmitting a torque originating from an output of said internal combustion engine to said drive shaft, and
- said step of setting a torque command value includes the step of setting an operation command value of said internal combustion engine and said torque command value of said electric motor such that the requested driving force for said entire vehicle is exerted on said drive shaft.

* * * * *